United States Patent

Takimoto et al.

Patent Number: 5,298,059
Date of Patent: Mar. 29, 1994

[54] ANTICORROSIVE COATING COMPOSITION

[75] Inventors: Masaaki Takimoto, Kadoma; Hisataka Yamamoto, Setagaya, both of Japan

[73] Assignees: Nippon Paint Co., Ltd.; Sumitomo Metal Industries Ltd., both of Osaka, Japan

[21] Appl. No.: 859,942

[22] Filed: Mar. 30, 1992

[30] Foreign Application Priority Data

Mar. 29, 1991 [JP] Japan ................... 3-66073

[51] Int. Cl.⁵ .............................. C09D 5/08
[52] U.S. Cl. ................. 106/14.17; 106/14.21; 106/14.42; 106/14.44
[58] Field of Search ............... 106/14.16–14.42

[56] References Cited

U.S. PATENT DOCUMENTS 4,510,282  4/1985  Goll ..................... 524/337

FOREIGN PATENT DOCUMENTS

| 0307996 | 3/1989 | European Pat. Off. | C09D 3/72 |
| 58-19706 | 4/1983 | Japan | C09D 5/38 |
| 60-65035 | 4/1985 | Japan | C08J 7/04 |
| 60-33850 | 10/1985 | Japan | C08L 67/02 |
| 62-73938 | 4/1987 | Japan | B32B 15/08 |
| 62-283161 | 12/1987 | Japan | C09D 3/58 |
| 64-65179 | 3/1989 | Japan | C09D 3/72 |

OTHER PUBLICATIONS

Derwent Abstract of SU 503893 Mar. 1976.
Patent Abstracts of Japan, Abstract of JP2149699 (and copy of JP 2-149699) Jun. 1990.
Derwent Abstract of JP 3028277 (and copy of JP 3-28277) Feb. 1991.

*Primary Examiner*—Mark L. Bell
*Assistant Examiner*—Margaret Einsmann
*Attorney, Agent, or Firm*—Sughrue, Mion, Zinn, Macpeak & Seas

[57] ABSTRACT

An anticorrosive coating composition, comprising 0.05 to 20% by weight of melamine cyanurate, 5 to 30% by weight of a thermosetting resin, 0 to 20% by weight of a curing agent, and 40 to 95% by weight of a solvent (providing that the total amount of said components is 100% by weight). It obviates the necessity for incorporating silica, a hydrophilic resin, and an electroconductive pigment and allows control of the density of electrification points in a film of a coating material using the composition.

19 Claims, 2 Drawing Sheets

FIG.3 cli
ANTICORROSIVE COATING COMPOSITION

BACKGROUND OF THE INVENTION

1. Field of the Invention:

This invention relates to an anticorrosive coating composition. More particularly, it relates to an anticorrosive coating composition to be used for the production of coating materials, which allows ideal control of the electrodeposition process, and to an anticorrosive coating composition for corrosion-proofed steel sheets which excel in their ability to withstand the electrodeposition process, stamping and spot welding, which exhibits a high level of corrosion resistance and retains excellent anticorrosion ability and adhesion after water soaking of the electrodeposition film, and which can be applied to various kinds of metal (including variegated substances).

2. Description of the Prior Art:

Rustproofed steel plates are copiously used in automobiles and electrical appliances, particularly in doors hoods and other parts of automobiles. The demand for rustproof steel sheets has been growing at an accelerated rate.

Figure 1:
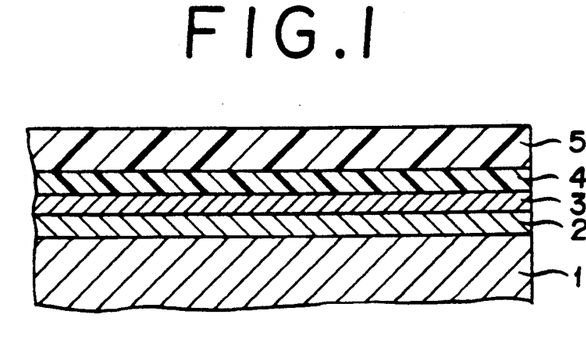
FIG. 1 is a schematic drawing illustrating the cross-sectional construction of a rustproof steel sheet.

The rustproofed steel plate is the result of giving a cold rolled steel plate 1 a zinc-nickel plate 2, subjecting the plated steel sheet to a chromating treatment applied with a roll coater 3, and deposition an organic coat 4 on the chromated substrate as illustrated in FIG. 1. Generally, this rustproofed steel sheet is coated with an electrodeposited film 5 and, if need be, further subjected to an intermediate coat and an overcoat.

The rustproof steel sheet of this construction desirably has an improved ability to withstand the electrodeposition process, stamping and spot welding. Such sheets desirably exhibit high corrosion resistance, and adhesion after the water soaking of the electrodeposition film.

For the purpose of meeting this desire, improvements have been attained concerning coating compositions to be used for rustproofed steel sheets. JP-A-62-73,938(1987), JP-A-62-283,161(1987), and JP-A-64-65,179(1989), for example, disclose methods which rely on incorporation of silica to the anticorrosion composition for the impartation of affinity during electrodeposition. Actually, for the acquisition of the appropriate affinity for electrodeposition, these methods require their anticorrosive compositions to have silica contents of not less than 27.5%. The incorporation of silica in these high concentrations sacrifices the ability of the anticorrosive composition to withstand the impacts of stamping and spot welding and gives rise to the possiblity that the treatment of the anticorrosive composition will be non-uniform owing to the dissolution of silica and separation of the silica from its coating during an alkaline cleaning process. JP-A-62-283,161(1987) discloses a method which relies on incorporation of a hydrophilic resin (such as, for example, polyamide resin) for the impartation of an appropriate affinity for electrodeposition to an anticorrosive coating composition. For the acquisition of an appropriate affinity for electrodeposition, this method requires the anticorrosive coating composition thereof to have a hydrophilic resin content of 5 to 40%. The incorporation of the hydrophilic resin results in sacrificing anticorrosiveness and imposing a limit on the use of a solvent (dibenzyl alcohol) and accordingly jeopardizing the economy of the anticorrosive coating composition. JP-A-50-146,340(1975) and JP-B-58-19,706(1983) disclose methods which involve incorporation of electroconductive pigments and metal pigments. Since these methods require their anticorrosive compositions to contain a metallic powder, zinc oxide, or a metal carbide which inherently has a relatively large particle diameter, the electrodeposition film coats formed of these anticorrosive coating compositions on steel plates suffer from the disadvantage that the surface of the treated plates lacks smoothness because of the unevenness of the coarse underlying particles and lead to problems in stamping. JP-A-62-283,161 (1987), with the same object as this invention, discloses a composition which comprises a urethanized polyester resin, a hydrophilic polyamide, and fumed silica. It further discloses a technique for producing an opalescent metallicized film by the incorporation of melamine cyanurate in a clear coating composition. This composition does not produce an effect suitable for the kind of electrodeposition which is the object of this invention.

The existing anticorrosive compositions, in spite of the latest improvements described above, are far short of producing coating properties on ideally balanced levels. When appropriate electrodeposition properties are obtained in the absolute absence of silica, hydrophilic resin, and electroconductive pigment or in the presence of these components only in extremely small amounts, various means such as variation of the base resin, extensive selection of a curing agent and an anticorrosive agent, and addition of pertinent components may easily be adopted.

An object of this invention, therefore, is to provide an anticorrosive coating composition which obviates the necessity for incorporating silica, a hydrophilic resin, and an electroconductive pigment and allows control of the density of electrification points in a film of a coating material using the composition.

Another object of this invention is to provide a coating composition for use on a rustproofed steel plate, which permits appropriate electrodeposition and excels in stamping, spotwelding, and high anticorrosive ability, and the ability to retain its anticorrosiveness and adhesion after water soaking of the electrodeposition film. Specifically an anticorrosive coating composition which is effectively applicable to various materials inclusive of a plurality of substrates.

SUMMARY OF THE INVENTION

These objects are accomplished by an anticorrosive coating composition which comprises 0.05 to 20% by weight of a melamine cyanurate, 5 to 30% by weight of a thermosetting resin, 0 to 20% by weight of a curing agent, and 40 to 95% by weight of a solvent (providing that the total of these components is 100% by weight).

These objects are further accomplished by an anticorrosive coating composition which comprises 0.05 to 20% by weight of a melamine cyanurate, 5 to 30% by weight of an epoxy resin, 1 to 15% by weight of a melamine resin or a blocked isocyanate, 1 to 50% by weight of an organic solvent, and 20 to 80% by weight of water (providing that the total of these components is 100% by weight).

EXPLANATION OF THE PREFERRED EMBODIMENT

This invention offers a perfect solution to the problem of unbalanced production of coating properties encountered by the conventional technique of incorporating a melamine cyanurate compound, i.e. an isocyanule ring-containing plane structure compound, in a coating material thereby enabling the produced coating material, when used as a thin-film type coating material for a rustproofed steel plate, to impart affinity for electrodeposition to the steel plate. The amount of the melamine cyanurate to be used is in the range of from 0.05 to 20% by weight, preferably 0.1 to 10% by weight, based on the solids content of the coating composition.

Figure 2:
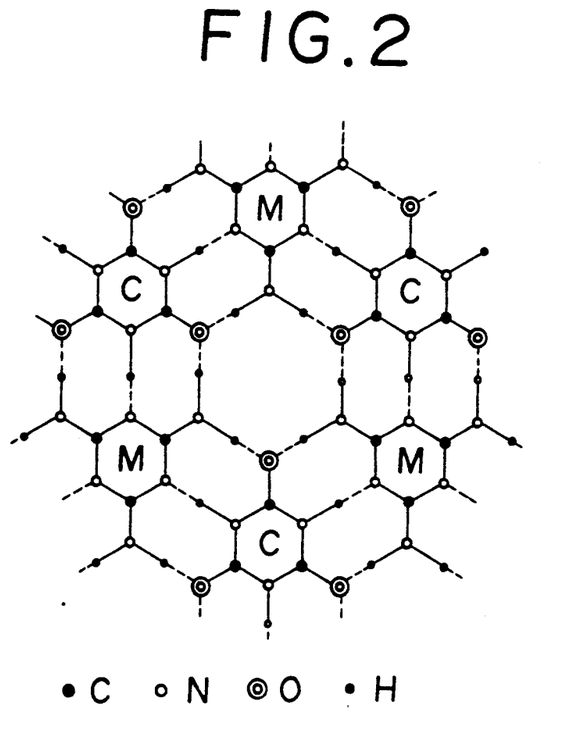
FIG. 2 is a drawing illustrating the plane construction of a melamine cyanurate crystal.
Figure 3:
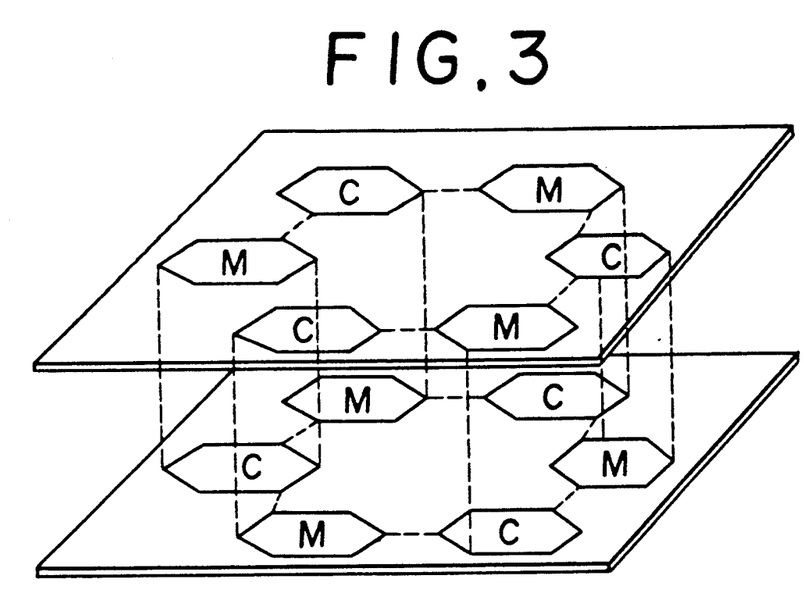
FIG. 3 is a drawing illustrating the steric construction of a melamine cyanurate crystal.

The melamine cyanurate compound to be used in this invention is a compound represented by the chemical formula:

More specifically, it is an equimolar addition compound of 2,4,6-triamino-1,3,5-triazine (hereinafter referred to as "melamine") and 2,4,6-trihydroxy-1,3,5-triazine (hereinafter referred to as "cyanuric acid") and/or a tautomeric isomer thereof. This compound in a solid state is presumed to form a crystal having melamine molecules and cyanuric acid molecules alternately adjoined in a state of weak binding through hydrogen atoms in a plane construction as illustrated in FIG. 2. Three-dimensionally, the compound is presumed to form the so-called graphite type construction, i.e. a construction of layers superimposed as separated by a fixed spatial interval as illustrated in FIG. 3. In FIG. 2 and FIG. 3, C is a cyanuric acid molecule and M is a melamine molecule.

The melamine cyanurate compounds in accordance with the description given above are produced by a method which is disclosed in JP-B-60-33,850 (1985), for example, and are commercially available from Nissan Chemical Industry Co., Ltd. as products of MC series (MC-FW, MC-PW, MC-UW, MC-420, MC-520, MC-600, etc.). In the patent publication, melamine cyanurate is introduced as a flame-retardant for formed articles of polyester resins.

The melamine cyanurate compounds excel in the ability to resist acids and alkalis and are so stable that they yield to no chemical changes in the range of pH 1 to 14. This fact indicates that, since the film formed by cation type electrodeposition is exposed to the hydrogen ion activity of the level of about pH 12, the coating composition of this invention which contains such a melamine cyanurate compound has the effect of preventing the electric load exerted during the electrodeposition, from impairing the initial adhesiveness of the boundary face of the underlying metal to the formed film.

The melamine cyanurate compounds are sparingly soluble in water and resistance to heat. Melamine cyanurate is not dissolved in organic solvents which are used for conventional coating compositions. Melamine cyanurate is barely soluble in a ratio of 0.011 g/100 ml at 70° C. in dimethyl sulfoxide. Thus, melamine cyanurate is not dissolved in water which possibly permeates under the electrodeposition film being formed and does not allow the water to form an obstruction to the electrodeposition.

For this invention, the coating composition is required to contain the anticorrosive composition of this invention in such a ratio that the coating composition will have a melamine cyanurate compound content in the range of from 0.05 to 20% by weight, preferably from 0.1 to 10% by weight, and more preferably from 0.2 to 5% by weight. The coating composition is not restricted at all with respect to the other components thereof. The kind of main resin and the kind of curing agent may be freely selected from among those generally accepted in the field of coating materials.

As examples of the thermosetting resin to be effectively used as a vehicle in this invention, such main resins as acrylic resins, polyester resins, alkyd resins, and epoxy resins may be cited. Among other thermosetting resins mentioned above, epoxy resins prove to be particularly desirable. The thermosetting resin may be used in combination with at least one curing agent to be selected from among amino resins such as melamine resins and benzoguanamine resins, isocyanates, and blocked isocyanates. Among other curing agents mentioned above, melanine resins and blocked isocyanates prove to be particularly desirable. The amount of a thermosetting resin to be incorporated in the composition is in the range of from 5 to 30% by weight, preferably from 8 to 25% by weight, and more preferably from 10 to 20% by weight. The amount of a curing agent to be incorporated in the composition is in the range of from 0 to 50% by weight, preferably from 3 to 18% by weight, and more preferably from 5 to 15% by weight. Particularly when an epoxy resin is used as the thermosetting resin, a melamine resin or a blocked isocyanate is an ideal choice as the curing agent. The amount of the melamine resin or blocked isocyanate to be used in this case is in the range of from 1 to 15% by weight, preferably from 3 to 13% by weight.

This invention optionally allows incorporation of a thermoplastic resin as a vehicle in the rust-proof coating composition. The thermoplastic resins which are effectively usable in this invention include chlorinated olefinic resins such as chlorinated polyethylene and chlorinated polypropylene, vinyl chloride resin, vinyl acetate, vinylidene chloride, and vinyl resins resulting from copolymerization thereof, celluloicresins, acetal resins, alkyd resin, and rubber chloride resins, for example.

Owing to the selection from among the resins mentioned above, the coating composition of this invention is capable of air drying or curing by heat, for example.

This invention allows incorporation of a pigment in the anticorrosive composition, depending on the purpose for which the composition is used. The pigments which are effectively usable in this invention are those generally used in the field of coating materials, including various organic and inorganic coloring pigments such as titanium dioxide, iron oxides (red oxide and yellow oxide), carbon black, lead chromate, phthalocyanine blue, phthalocyanine green, and quinacridone, extenders such as sedimenting calcium carbonate, vanadium sulfate, kaolin, clay, and calcium carbon, corrosionproofing pigments such as zinc chromate, strontium chromate, calcium chromate, barium chromate, magnesium chromate, red lead, lead suboxide, basic lead chromate, lead cyanamide, calcium metaplumbate, zinc phosphate, aluminum phosphate, calcium phosphate, and mixture of metallic zinc whiteand glass flake powder, brilliant pigments such as flaky aluminum powder paste and titanium-coated mica flake which are intended to emit a metallic like pigments, special pigments such as various fluorescent agents which are used for fluorescent coating materials, and antifouling agents such as copper suboxide, for example. The anticorrosive composition, when necessary, may incorporate therein a lubricant such as polyethylene or polyethylene fluoride powder or molybdenum difluoride for the purpose of imparting improved lubricity to the film to be obtained by coating a surface with the composition. The pigment and lubricant can be used for the incorporation in amounts not exceeding the critical concentration of extenders. The corrosion proofing pigment is incorporated in an amount in the range of from 0.5 to 30% by weight, preferably 1 to 25% by weight.

The solvents which are effectively usable in this invention are those generally used in the field of coating materials. They include aromatic hydrocarbons such as toluene and xylene, aliphatic hydrocarbons such as cyclohexane, ethyl cyclohexane, and perchloroethylene, alcohols such as methyl alcohol, ethyl alcohol, isopropyl alcohol, butyl alcohol, isobutyl alcohol, 2-butyl alcohol, benzyl alcohol, and cyclohexanol, esters such as ethyl acetate, butyl acetate, and isobutyl acetate, ketones such as acetone, methylethyl ketone, methylisobutyl ketone, cyclohexanone, isophorone, and diacetone alcohol, cellosolve, butyl cellosolve, cellosolve acetate, Carbitol acetate, dioxane, tetrahydrofuran, dimethyl formamide, nitropropane, styrene, mineral spirit, and water and mixtures thereof, for example. One solvent may be selected from among those cited above so as to suit the vehicle used for the coating composition and the pigment incorporated therein. The solvent is used in an amount in the range of from 40 to 95% weight, preferably from 45 to 90% by weight, and more desirably from 40 to 85% by weight. When an epoxy resin is used as the vehicle and a melamine resin or a blocked isocyanate is used as the curing agent, it is desirable to use the organic solvent in an amount of from 1 to 50% by weight, preferably from 5 to 40% by weight and water in an amount of from 20 to 80% by weight, preferably from 25 to 75% by weight.

The various additives which are effectively usable in this invention are those generally adopted in the field of coating materials. They include curing catalysts such as dodecylbenzene sulfonate, ultraviolet absorbents such as benzophenol-based absorbents, antioxidants such as phenol-based and sulfide-based compounds, surface adjusting agents such as silicones and organic macromolecular compounds, rheology control agents, antisagging agents, and lubricants, for example. These additives are incorporated in the coating composition in a total amount of not more than 5 parts by weight to improve the coating properties of the coating material and the performance of the film to be produced. If the total amount is excessively large, disadvantage arises in that the coating composition incorporating these additives like any conventional coating composition induces the phenomenon of expulsion of the coating composition from a given surface during the formation of a film on the surface and the adhesion of the coating composition to the opposed surfaces of the adjacent superposed surfaces is impaired.

The coating composition, when necessary for the purpose of improving the rust proofing property thereof, may incorporate therein silica such as fumed silica preferably in an amount of from 0.05 to 20% by weight, more preferably from 0.1 to 10% by weight, based on the solids content of the coating composition.

Various devices such as a dissolver, a sand grind mill, and a kneader which are generally employed in the production of coating compositions are available for the dispersion and mixture of the components of the coating composition of this invention.

The substrates on which the coating composition of this invention can be effectively applied include not only steel plates but also sheets of electroconductive materials such as rolled steel plates, galvanized steel plates (using such alloys as zinc-aluminum and zinc-nickel), stainless steel plates, aluminum plates, copper plates, and brass plates and plates formed of nonconductive substrates such as FRP, polyethylene, polypropylene, polyamide, acrylic resin, polyvinyl chloride resin, polyvinylidene chloride, polycarbonate, polyurethane, and various species of rubber and modified to acquire electroconductivity as by the incorporation of an electroconductive material in the nonconductive substrates or by the use of the electroless coating techniques. The plates which are obtained by uniting a plate of an electroconductive primer with a substrates of a nonconductive material by adhesion or fixation may be cited as other examples.

The method for applying the coating composition of this invention to the surface of a substrate is not specifically limited. Such methods of coating such as air spray coating, airless coating, electrostatic coating, and brushing which are generally employed are available for the application of the coating composition. Particularly, the gravure coating method, the roll coating method, the curtain coating method, the offset gravure coating method, etc. which are excellent in regard to the accuracy of the thickness of the applied film and the smoothness of the surface of the applied film are also available.

The coating composition of this invention can be used for a coating which is carried out by any of the methods enumerated above and it can be used in the form of a cation type or anion type electrodepositing coatings. In this case, an increased density of points of electrification is effective in enhancing characteristic properties such as the uniformity of the coated film, the throwing power, the adhesion of the coating composition to and round the edge parts of a substrates, the power to rustproof the edges, and the appearance of the film formed by electrodeposition. Further since the electroconductivity of the coating composition for electrodeposition is improved, the film formed by the application of this coating composition can be increased in thickness. Moreover, while the conventional coating by electrodeposition encounters difficulties in producing a coating in two layers and inevitably finds limited utility in the production of one-layer finishing, the coating composition of this invention allows formation of a coating film of two or more layers.

The nitrogen atoms in the melamine cyanurate compound possessing a plane construction have a donative propensity (for cations). In terms of molecular size, the nitrogen atoms are vertically vibrating and, depending on the electric charge particles closely approximating thereto, are able by their own vibration to invert the electric charge. During the coating by electrodeposition, the portions of the compound encircling the nitrogen atoms can serve as effective points of electrification. Owing to this fact, due to the melamine cyanurate compound contained therein, the coating composition of this invention is only allowed to acquire in small amounts an ideal affinity for electrodeposition and control the density of points of electrification by variation of the content of the melamine cyanurate compound.

Further, in recent years, since automobile bodies are required to possess sufficiently high corrosion resistance, the coating has come to be performed prevalently by the cation type electrodeposition which produces a basic film and involves a reducing electrode reaction and, therefore, avoids desolution of metallic ions and excels in corrosion resistance and resistance to bases. The zeta potential of the coating composition of this invention assumes a minus mV above pH 7 and a plus mV below pH 7 as indicated in Table 1. This behavior of the zeta potential coincides with the mechanism of the formation of a film by the cation electrodeposition and, therefore, the formation of this film proceeds smoothly.

TABLE 1

| pH | 3 | 4 | 6 | 7 | 8 | 9 | 10 |
|---|---|---|---|---|---|---|---|
| zeta potential (mV) | +60 | +55 | +20 | ±0 | −20 | −25 | −30 |

The coating composition of the present invention is dissolved or dispersed in a solvent (e.g., an organic solvent, water, etc.) or a dispersant according to the purpose and use to obtain the paint, lacquer, or coating solution, or electrodeposition bath which is generally called "coating composition", and then the dissolved or dispereed coating composition is coated on the substrate to form a film. As a result, said coated wet film is cured or hardened by heating, or stoving and baking.

Now, this invention will be described more specifically below with reference to the working examples. The amounts of addition expressed in % by weight are based on the solids content of a pertinent coating composition.

Examples 1 to 13 and Controls 1 to 7

A coating material containing bisphenol-A type epoxy (produced by Toto Kasei K.K. and marketed under trademark designation of "Epototo YD017") as a base resin and blocked isocyanate (produced by Nippon Polyurethane Kogyo K.K. and marketed under trademark designation of "Coronate 2513") as a curing agent at a base resin/curing agent weight ratio (solids content ratio) of 10/3 (content is shown in Tables 2 and 3), containing 2% of polyethylene wax (produced by Hoechst Japan K.K.) as a lubricant, and further containing a melamine cyanurate compound (produced by Nissan Chemical Industry Co., Ltd. and marketed under product code of "MC-600;" similarly applicable hereinafter), and/or silica particles (produced by Japan Aerosil K.K. and marketed under trademark designation of "Aerosil A-300;" similarly applicable hereinafter) was prepared. A steel sheet (0.8 mm in thickness) plated with zinc-nickel at 20 g/m$^2$ by weight and subjected to a chromating treatment applied with a roll coater at 60 mg/m$^2$ by weight (calculated to hexavalent chromium). And then, the coating composition of this invention was applied in a thickness of 1.0 μm (on dry thickness) to said chromium coated steel sheet, and baked at temperatures up to 150° C. for 20 seconds. On the coated steel sheet, a cation type electrodeposition coating composition (produced by Nippon Paint Co., Ltd. and marketed under trademark designation of "Power Top U-600 Gray") was superimposed by electrodeposition performed at a voltage of 170 V for two minutes 30 seconds, with the voltage increased over a period of 30 seconds. The deposited coating composition was baked at 170° C. for 20 minutes. Then, the produced coated steel sheet was subjected to the following tests. The content of the melamine cyanurate compound MC-600 and/or that of the silica particles A-300 in the coating composition and the test results are shown in Table 2 and Table 3. The coating composition was used for coating after diluting with 400 parts by weight of deionized water.

(1) Appearance of electrodeposited film

The surfaces of the electrodeposited films obtained in the working examples and the controls were visually examined as to the coating condition. The results are shown in Table 2 and Table 3. The coating condition of the surface of electrodeposited film was rated on the four-point scale, wherein ○ is satisfactory coating condition (showing the same appearance as the surface of a rolled steel sheet and a rolled steel sheet treated with zinc phosphate), Δ is indication of (slight) surface coarseness, x is indication of (heavy) surface coarseness, and xx is rough texture gas pinhole.

(2) Immersion test of hot saline solution

The electrodeposition films formed on steel sheets in the working examples and the controls were incised with hatching deep enough to reach the substrate, left standing for 10 days (240 hours) in an aqueous 5 wt % NaCl solution at 55° C., taken out from the saline solution, and dried. An cellophance tape (2.4 cm in width was) applied to the hatching part of each electrodeposition film and then peeled off the tape to take count of squares peeled from the hatching part by way of determining the electrodeposition film. The results are shown in Table 2 and Table 3. The numerical values indicated therein each represent the maximum width of separation along the opposite edges of a given cross-cut part.

(3) Immersion test of electrodeposited film for resistance to hot water

The electrodeposition films formed on steel sheets in the working examples and the controls were incised with perpendicularly intersecting regularly spaced linear cuts defining a total of 100 small squares of 1 mm deep enough to reach the substrate left standing for 20 days (480 hours) in hot water at 50° C., took out the hot water, and dried. An cellophane tape 2.4 cm in width was applied to the hatching part and peeled off the the film to take count of squares peeled from the hatching part and evaluate the electrodeposition film based on the number of peeled squares reported in the multiple of 1/100. Thus, 100/100 is an ideal sample producing no separated square and 0/100 is a sample of total failure retaining absolutely no square. The results are shown in Table 2 and Table 3.

(4) Test for spot welding

On each of the electrodeposited films obtained in the working examples and the controls, spot welding was performed with a single spot welder (produced by Daiden K.K. and marketed under product code of "SL-AJ") at a total of 5,000 points under the conditions of 8,000 A of welding current, 200 kg of electrode pressure, 0.2 second of welding time (three cycles of up-slope in a total of 10 cycles), electrode of chromium copper (copper content 1 to 2%) WR type, 4.5 mm of electrode diameter, 0.2 second of welding time (10 cycles), and 0.6 second of squeezing time (30 cycles). The condition of welded spots and the degree of defilement of nugget were visually examined. The results are shown in Table 2 and Table 3. The condition of welded spots and the degree of defilement of nuggets were rated on the following scales.

Condition of welded spots
○ is round welded spots without abnormality,
Δ is forslight distortion round welded spots,
x is insufficient depth of welding,
— is absence of weldability (or no welding performed).

Degree of defilement of nugget
○ is absence of defilement,
Δ is slight defilement,
x is heavy defilement.

Spot welding was evaluated by welding surface of a test prirece coated with the coating composition of the present invention with surface of a bare steel sheet.

age increase, and two minutes 30 seconds of electrodeposition time, and baked at 170° C. for 20 minutes. The electrodeposition film was visually examined as to appearance and subjected to an immersion test in the same manner as indicated in (1) and (2). The content of the melamine cyanurate compound MC-600 and/or that of silica particles A-300 in the film and the results of the test are shown in Table 7.

In Examples 14 to 29, about 100 parts of the resin content was diluted with 400 parts of cyclohexanone to obtain the solid content shown in Table 6.

In Examples 30 to 36, about 100 parts of the resin content was diluted with 400 parts of cyclohexanone, in Examples 43–45, about 100 parts of the resin content

TABLE 2

| | Example | | | | | | | | | |
|---|---|---|---|---|---|---|---|---|---|---|
| | 1 | 2 | 3 | 4 | 5 | 6 | 7 | 8 | 9 | 10 |
| Solid content of base resin and curing agent (% by weight) | 19.8 | 18.8 | 17.8 | 19.4 | 18.4 | 17.4 | 19.0 | 18.0 | 17.0 | 16.0 |
| MC-600 (% by weight) | 0.2 | 0.2 | 0.2 | 0.6 | 0.6 | 0.6 | 1.0 | 1.0 | 1.0 | 1.0 |
| A-300 (% by weight) | 0 | 1.0 | 2.0 | 0 | 1.0 | 2.0 | 0 | 1.0 | 2.0 | 3.0 |
| Cyclohexanone (% by weight) | 80 | 80 | 80 | 80 | 80 | 80 | 80 | 80 | 80 | 80 |
| Appearance of electrodeposition film | ○ | ○ | ○ | ○ | ○ | ○ | ○ | ○ | ○ | ○ |
| Width of peeling (mm) in test for to hot saline solution resistance | 0 | 0 | 0 | 0 | 0 | 0 | 0 | 0 | 0 | 0 |
| Peeling sequares from hatching partin test for hot water resistance | 100/100 | 100/100 | 100/100 | 100/100 | 100/100 | 100/100 | 100/100 | 100/100 | 100/100 | 100/100 |
| Spot welding | ○ | ○ | ○ | ○ | ○ | ○ | ○ | ○ | ○ | ○ |

TABLE 3

| | Example | | | Control | | | | | |
|---|---|---|---|---|---|---|---|---|---|
| | 11 | 12 | 13 | 1 | 2 | 3 | 4 | 5 | 6 |
| Solid content of base resin and curing agent (% by weight) | 36 | 32 | 28 | 18.0 | 17.0 | 16.0 | 15.0 | 14.5 | 14.0 |
| MC-600 (% by weight) | 4 | 8 | 12 | 0 | 0 | 0 | 0 | 0 | 0 |
| A-300 (% by weight) | 0 | 0 | 0 | 2.0 | 3.0 | 4.0 | 5.0 | 5.5 | 6.0 |
| Cyclohexanone (% by weight) | 60 | 60 | 60 | 80 | 80 | 80 | 80 | 80 | 80 |
| Appearance of electrodeposition film | ○ | ○ | ○ | XX | XX | X | Δ | ○ | ○ |
| Width of peeling (mm) in test for hot saline solution resistance | 0 | 0 | 0 | 25 | 25 | 15 | 5 | 0 | 2 |
| Peeling sequares from hatching part in test for hot water resistance | 100/100 | 100/100 | 100/100 | 0/100 | 0/100 | 50/100 | 50/100 | 100/100 | 80/100 |
| Spot welding | ○ | ○ | ○ | X | — | Δ | — | — | ○ |

EXAMPLES 14 to 45

Various coating compositions were prepared by combining various main resins and curing agents with a melamine cyanurate compound MC-600, and/or silica particles A-300, and/or various pigments and additives (indicated in Table 4). The coating materials were respectively applied in a dry thickness of 1.0 μm to a substrate indicated in Table 5, and treated at temperatures up to 150° C. for 20 seconds, and cured. On the resultant coated sheet, a cation type electrodeposition coating material (produced by Nippon Paint K.K. and marketed under trademark designation of "Powder Top U-600 Gray") was applied by electrodeposition under the conditions of 170 V of voltage, 30 seconds of voltwas diluted with 900 parts of cyclohexanone, and in Examples 37 to 42, about 100 parts of the resin content was diluted with 400 parts of water to obtain the solid content shown in Table 7.

EXAMPLES 46–48

Various coating compositions were prepared by a similar method to Example 1-13 as shown in Table 8. The compositions were subjected to test by a similar method to Examples 1-13. the test results are shown in Table 8.

TABLE 4

| Symbol of additive | Kind of additive |
|---|---|
| a | Inorganic coloring pigment (iron oxide) red oxide CH25P(produced by Nippon Bengara K.K) |
| b | Inorganic coloring pigment (iron oxide), Mapico Yellow LLXL0 (produced by Titan Kogyo K.K.) |
| c | titanium dioxide |
| d | calcium carbonate |
| e | Inorganic rust-proofing pigment, zinc chromate |
| f | Organic coloring pigment, Fastgen Red 7061BT (produced by Dainippon Ink Kogyo K.K.) |
| g | Organic coloring pigment, Shimura Fast Yellow 4GO (produced by Dainippon Ink Kogyo K.K.) |
| h | Organic coloring pigment, Fastgen Blue GFB (produced by Dainippon Ink Kogyo K.K.) |
| i | Brilliant pigment, Alupaste 65-480 (produced by Toyo Aluminum K.K.) |

TABLE 5

| Symbol | Substrate for coating of material |
|---|---|
| A | Cold rolled Steel sheet (0.8 mm in thickness) plated with 30 g/m$^2$ Zn—Ni coat and chromated with a chromate coat in 60 mg/m$^2$ by weight. |
| B | Rolled steel sheet 0.8 mm in thickness chromated with a chromate coat in a ratio of 60 mg/m$^2$ by weight |
| C | Steel sheet plated with Zn coat 0.8 mm in thickness and chromated with a chromate coat in 60 mg/m$^2$ by weight |
| D | Aluminum sheet 1.0 mm in thickness chromated with a chromate coat in a ratio of 60 mg/m$^2$ by weight |
| E | Polypropylene sheet 1.0 mm in thickness coated with vacuum deposited gold (0.2 μm in thickness) |
| F | Electroconductive rubber sheet 1.0 mm in thickness (insulation resistance 10.2 Ω/□) |
| G | Integrated combination of a Zn—Ni plated steel sheet with SMC (a sheet of sheet molding compound/saturated polyester containing glass fibers) treated for acquisition of electroconductivity 1.0 mm in total thickness |

TABLE 6

| Example | Material | Base resin/curing agent Name of base resin/name of curing agent producer's name in parentheses | Solid content of base resin and curing agent (wt %) | Weight ratio of base resin and curing agent | Content (wt %) MC-600 | Content (wt %) A-300 | Additive Kind | Additive weight (%) | Appearance | Immersion test for resistance in hot water |
|---|---|---|---|---|---|---|---|---|---|---|
| 14 | A | Bisphenol AEp (Ep1003)/phenol Epototo YD013 (Toto Kasei K.K.)/Shonol BKS316 (Showa Kobunshi K.K.) | 18.4 | 8/2 | 0.6 | 1.0 | — | — | ○ | 100/100 |
| 15 | B | Bisphenol AEp (Ep1003)/Urea melamine Epototo YD013 (same as above)/Beckroll G1850 (Dainippon Ink K.K:) | 17.0 | 8/2 | 1.0 | 2.0 | — | — | ○ | 100/100 |
| 16 | C | Bisphenol AEp (Fp1003)/melamine methylate Epototo YD013 (same as above)/Sumimar H40S (Sumitomo Chemical Industry K.K.) | 16.4 | 8/2 | 0.6 | 3.0 | — | — | ○ | 100/100 |
| 17 | D | Bisphenol AEp (Ep1003)/block isocyanate Epototo YD013 (same as above)/Coronate 2513 (Nippon Polyurethane Kogyo K.K.) | 18.0 | 8/2 | 1.0 | 1.0 | a | 0.2 | ○ | 100/100 |
| 18 | A | Bisphenol AEp (Ep1004)/phenol Epototo YD013 (Toto Kasei K.K.)/Shonol BKS316 (Showa Kobunshi K.K.) | 17.4 | 8/2 | 0.6 | 2.0 | — | — | ○ | 100/100 |
| 19 | E | Bisphenol AEp (Ep1004)/urea melamine Epototo YD014 (same as above)/Beckrol G1850 (Dainippon Ink K.K.) | 18.0 | 8/2 | 1.0 | 1.0 | f | 0.2 | ○ | 100/100 |
| 20 | F | Bisphenol AEp (Ep1004)/melamine methylate Epototo YD014 (same as above)/Sumimar H40S (Sumitomo Chemical Industry K.K.) | 18.4 | 8/2 | 0.6 | 1.0 | b | 0.2 | ○ | 100/100 |
| 21 | G | Bisphenol AEp (Ep1004)/block isocyanate Epototo YD014 (same as above)/Coronate 2513 (Nippon Polyurethane Kogyo K.K.) | 17.0 | 8/2 | 1.0 | 2.0 | g | 0.2 | ○ | 100/100 |
| 22 | A | Bisphenol AEp (Ep1007)/phenol Epototo YD017 (same as above)/Shonol BKSk316 (Showa Kobunshi K.K.) | 16.4 | 8/2 | 0.6 | 3.0 | — | — | ○ | 100/100 |
| 23 | B | Bisphenol AEp (Ep1007)/urea melamine Epototo YD017 (same as above)/Beckrol G1850 (Dainippon Ink K.K.) | 18.0 | 8/2 | 1.0 | 1.0 | c | 0.4 | ○ | 100/100 |
| 24 | C | Bisphenol AEp (Ep1007)/melamine methylate Epototo YD017 (same as above)/Sumimar H40S (Sumitomo Chemical Industry K.K.) | 17.4 | 8/2 | 0.6 | 2.0 | — | — | ○ | 100/100 |
| 25 | D | Bisphenol AEp (Ep1007)/block isocyanate Epototo YD017 (same as above)/Coronate 2513 (Nippon Polyurethane Kogyo K.K.) | 16.0 | 8/2 | 1.0 | 3.0 | a | 0.2 | ○ | 100/100 |
| 26 | A | Bisphenol AEp (Ep1009)/phenol Epototo YD019 (same as above)/Shonol BKS 316 (Showa Kobunshi K.K.) | 18.4 | 8/2 | 0.6 | 1.0 | f | 0.4 | ○ | 100/100 |
| 27 | E | Bisphenol AEp (Ep1009)/urea melamine Epototo YD019 (same as above)/Beckrol 61850 (Dainippon Ink K.K.) | 17.0 | 8/2 | 1.0 | 2.0 | — | — | ○ | 100/100 |
| 28 | F | Bisphenol AEp (Ep1009)/melamine methylate Epototo YD019 (same as above)/Sumimar H40S (Sumitoto Chemical Industry K.K.) | 17.0 | 8/2 | 0.6 | 3.0 | — | — | ○ | 100/100 |
| 29 | G | Bisphenol AEp (Ep1009)/block isocyanate Epototo YDk019 (same as above)/Coronate 2513 (Nippon Polyurethane Kogyo K.K.) | 18.0 | 8/2 | 1.0 | 1.0 | h | 0.01 | ○ | 100/100 |

TABLE 7

| Example | Material | Base resin/curing agent Name of base resin/name of curing agent producer's name in parentheses | Solid content of base resin and curing agent (wt %) | Weight ratio of base resin and curing agent | Content (wt %) MC-600 | Content (wt %) A-300 | Additive Kind | Additive weight (%) | Appearance | Immersion test for resistance in hot water |
|---|---|---|---|---|---|---|---|---|---|---|
| 30 | A | Acryl polyol/melamine Aroset 5534/Super Beckermin 1-110-60 (Nihon Shokubai Kagaku Kogyo K.K.)/(Dainippon Ink K.K.) | 17.4 | 8/2 | 0.6 | 2.0 | d | 0.04 | ○ | 100/100 |
| 31 | A | Acryl polyol/block isocyanate Aroset 5534 (same as above)/Coronate 2513 (Nippon Polurethane Kogyo K.K.) | 16.0 | 8/2 | 1.0 | 3.0 | — | — | ○ | 100/100 |
| 32 | B | Macromolecular polyester/melamine—melamine methylate Byron 200 (Toyo Spinning K.K.)/Sumikol 40S (Sumitomo Chemican Industry K.K.) | 18.4 | 8/2 | 0.6 | 1.0 | e | 1.0 | ○ | 100/100 |
| 33 | C | Macromolecular polyester/block isocyanate Byron 200 (same as above)/Coronate 2513 (Nippon Polyurethane Kogyo K.K.) | 17.0 | 8/2 | 1.0 | 2.0 | — | — | ○ | 100/100 |
| 34 | D | Oil-free polyester/melamine butylate Almatic N500 (Mitsui-Toatsu Kagaku K.K.)/Uban 20SE-60 (same as left) | 16.4 | 8/2 | 0.6 | 3.0 | — | — | ○ | 100/100 |
| 35 | E | Oil-free polyester/block isocyanate, Almatic N500 (same as above)/Desmodule TPIS2759 (Sumitomo Bayer Urethane K.K.) | 18.0 | 8/2 | 1.0 | 1.0 | i | 0.1 | ○ | 100/100 |
| 36 | F | Silicon-modified polyester/melamine methylate R6250 (Nippon Paint K.K.)/Sumimar H40S (Sumitomo Chemical Industry K.K.) | 17.4 | 8/2 | 0.6 | 2.0 | — | — | ○ | 100/100 |
| 37 | A | Aqueous epoxy emulsion/aliphatic amine Epolsion EA55 (Kanebo NSC K.K.)/Epolsion EB-1 (same as left) | 16.4 | 8/2 | 0.6 | 3.0 | — | — | ○ | 100/100 |
| 38 | A | Aqueous epoxy emulsion/alicyclic amine Epolsion EA55 (Kanebo NSC K.K.)/Epolsion EB-10 (same as left) | 18.0 | 8/1 | 1.0 | 1.0 | f | 0.3 | ○ | 100/100 |
| 39 | G | Aqueous epoxy emulsion/latent amine Epolsion EA55 (Kanebo NSC K.K.)/Epolsion HA-50 (same as left) | 17.4 | 8/1 | 0.6 | 2.0 | — | — | ○ | 100/100 |
| 40 | B | Aqueous acryl emulsion/fatty amine ME1200 (Nippon Paint K.K.)/Epolsion EB-1 (Kanebo NSC K.K.) | 16.4 | 8/2 | 0.6 | 3.0 | — | — | ○ | 100/100 |
| 41 | C | Aqueous acryl emulsion/alicyclic amine ME1200 (Nippon Paint K.K.)/Epolsion EB-10 (same as left) | 18.0 | 8/1 | 1.0 | 1.0 | e | 2.0 | ○ | 100/100 |
| 42 | D | Aqueous acryl emulsion/latent amine ME1200 (Nippon Paint K.K.)/Epolsion HA-50 (same as left) | 17.4 | 8/1 | 0.6 | 2.0 | e | 1.0 | ○ | 100/100 |
| 43 | A | Bisphenol A Ep(Ep 1007)/phenol Epoto YDO17 (Toto Kasei KK)/Shonol BKS 316 (Showa Kobunshi K.K.) | 8.2 | 7/3 | 0.3 | 1.5 | — | — | ○ | 100/100 |
| 44 | A | Bisphenol A Ep(Ep 1007)/phenol Epoto YDO17 (Toto Kasei KK)/Shonol BKS 316 (Showa Kobunshi K.K.) | 8.2 | 8.5/1.5 | 0.3 | 1.5 | — | — | ○ | 100/100 |
| 45 | A | Bisphenol A Ep(Ep 1007)/phenol Epoto YDO17 (Toto Kasei KK)/Shonol BKS 316 (Showa Kobunshi K.K.) | 8.2 | 9/1 | 0.3 | 1.5 | — | — | ○ | 100/100 |

TABLE 8

| | Example 46 | Example 47 | Example 48 |
|---|---|---|---|
| Solid content of base resin and curing agent (% by weight) | 18.0 | 16.0 | 16.0 |
| MC-600 (% by weight) | 6 | 5 | 4 |
| Appearance of electrodeposition film | ○ | ○ | ○ |
| Width (mm) in test for hot water resistance | 0 | 0 | 0 |
| Peeling sequares from hatching part in test for hot water resistance | 100/100 | 100/100 | 100/100 |
| Spot welding | ○ | ○ | ○ |
| OX-50 (% by weight) | 1.0 | 4.0 | 5.0 |

The "appearance" indicated in Table 6 and Table 7 refers to the appearance of an electrodeposited film. The sign "—" in the column showing additives means the absence of addition.

The anticorrosive coating composition of this invention having a melamine cyanurate compound incorporated in a coating composition allows control of the density of electrification points of the coat formed by electrodeposition by varying the melamine cyanurate compound content in the composition. Thus, this invention allows provision of coating compositions excelling in ability to withstand spot welding, coating composition for rustproof steel plates excelling in ability to withstand the process of electrodeposition, press forming, and spot welding, exhibiting high rust-proofing property, and retaining excellent corrosion resistance and adhesion after water soaking of the electrodeposition film, and a coating composition effectively applicable to various materials. The electrodeposition coating composition using the rust-proofing composition of this invention is effective in improving characteristic properties such as the throwing power, the power to corrosion proof edges of test piece, and the appearance of an electrodeposition film. Further, the rust-proofing composition is capable of improving the electroconductivity of the electrodeposition coating composition itself. Unlike the conventional electrodeposition coating which encounters difficulties in producing a coating in two layers and finds only limited utility in the production of a single-layer finishing, the coating composition using the anticorrosive coating composition of this invention is able to produce a coating of two or more layers.

What is claimed is:

1. An anticorrosive coating composition consisting essentially of 0.05 to 20% by weight of melamine cyanurate, 5 to 30% by weight of a thermosetting resin, 0 to 20% by weight of a curing agent, 40 to 95% by weight of a solvent, and 0.05% to 20% by weight of fumed silica.

2. A composition according to claim 1, wherein the amount of said melamine cyanurate is in the range of from 0.1 to 10% by weight.

3. A composition according to claim 1, wherein the amount of said melamine cyanurate is in the range of from 0.2 to 5% by weight.

4. A composition according to claim 1, wherein said thermosetting resin is at least one member selected from the group consisting of acryl resins, polyester resins, alkyd resins, and epoxy resins.

5. A composition according to claim 4, wherein said curing agent is at least one member selected from the group consisting of amino resin, isocyanate, and blocked isocyanate.

6. A composition according to claim 1, wherein the amount of said fumed silica is in the range of from 0.5 to 10% by weight.

7. An anticorrosive coating composition, consisting essentially of 0.05 to 20% by weight of melamine cyanurate, 5 to 30% by weight of a thermosetting resin, 0 to 20% by weight of a curing agent, 40 to 95% by weight of a solvent and 0.5 to 30% by weight of a corrosion-proofing pigment, provided that the total amount of said components is 100% by weight.

8. A composition according to claim 7, wherein the amount of said corrosion-proofing pigment is 1 to 25% by weight.

9. A composition according to claim 7, wherein the amount of said melamine cyanurate is from 0.1 to 10% by weight.

10. A composition according to claim 7, wherein the amount of said melamine cyanurate is from 0.2 to 5% by weight.

11. A composition according to claim 7, wherein said thermosetting resin is at least one member selected from the group consisting of acrylic resins, polyester resins, alkyd resins, and epoxy resins.

12. A composition according to claim 7, wherein said curing agent is at least one member selected from the group consisting of amino resins, isocyanates, and blocked isocyanates.

13. An anticorrosive coating composition, consisting essentially of 0.05 to 20% by weight of melamine cyanurate, 5 to 30% by weight of a thermosetting resin, 0 to 20% by weight of a curing agent, 40 to 95% by weight of a solvent, 0.05% to 20% by weight of fumed silica and 0.5 to 30% by weight of a corrosion-proofing pigment, provided that the total amount of said components is 100% by weight.

14. A composition according to claim 13, wherein the amount of said corrosion-proofing pigment is from 1 to 25% by weight.

15. A composition according to claim 13, wherein the amount of said melamine cyanurate is from 0.1 to 10% by weight.

16. A composition according to claim 13, wherein the amount of said melamine cyanurate is from 0.1 to 5% by weight.

17. A composition according to claim 13, wherein said thermosetting resin is at least one member selected from the group consisting of acrylic resins, polyester resins, alkyd resins, and epoxy resins.

18. A composition according to claim 13, wherein said curing agent is at least one member selected from the group consisting of amino resins, isocyanates, and blocked isocyanates.

19. A composition according to claim 13, wherein the amount of said fumed silica is from 0.1 to 10% by weight.

* * * * *